(12) United States Patent
Deck et al.

(10) Patent No.: US 9,415,411 B2
(45) Date of Patent: Aug. 16, 2016

(54) MASKING PLUG

(71) Applicant: The Boeing Company, Chicago, IL (US)

(72) Inventors: Eric E. Deck, Ladue, MO (US); Carl Dekker, Saint Charles, IL (US)

(73) Assignee: The Boeing Company, Chicago, IL (US)

( * ) Notice: Subject to any disclaimer, the term of this patent is extended or adjusted under 35 U.S.C. 154(b) by 189 days.

(21) Appl. No.: 14/146,797

(22) Filed: Jan. 3, 2014

(65) Prior Publication Data
US 2015/0190836 A1 Jul. 9, 2015

(51) Int. Cl.
| | |
|---|---|
| B32B 7/08 | (2006.01) |
| B29C 65/00 | (2006.01) |
| B32B 27/00 | (2006.01) |
| B32B 37/00 | (2006.01) |
| B29C 65/78 | (2006.01) |
| B65D 53/00 | (2006.01) |
| B65D 39/12 | (2006.01) |
| B05C 11/11 | (2006.01) |
| B05B 15/04 | (2006.01) |
| F16L 55/136 | (2006.01) |
| B29C 65/56 | (2006.01) |

(52) U.S. Cl.
CPC ........... *B05B 15/0462* (2013.01); *B29C 65/565* (2013.01); *F16L 55/136* (2013.01)

(58) Field of Classification Search
CPC .... B05B 15/0462; B65D 39/00; B65D 39/12; B29C 65/00; B29C 65/002; B29C 65/56; B29C 65/565; B29C 65/76; F16L 55/12; F16L 55/13; F16L 55/132; F16L 55/136
USPC ......... 156/60, 71, 91, 92, 278, 280, 293, 297, 156/298, 303.1, 391, 423; 220/233, 234, 220/235, 238; 215/355, 358, 359, 360, 361; 29/402.09; 118/504, 505
See application file for complete search history.

(56) References Cited

U.S. PATENT DOCUMENTS 2,784,636 A * 3/1957 Bohmer ................ F16B 13/122
220/233
6,419,104 B1 7/2002 Sarajian

FOREIGN PATENT DOCUMENTS

EP 1609533 12/2005

* cited by examiner

*Primary Examiner* — Philip Tucker
*Assistant Examiner* — Brian R Slawski
(74) *Attorney, Agent, or Firm* — Walters & Wasylyna LLC

(57) ABSTRACT

A masking plug may including a retainer having a longitudinal axis, the retainer including a central portion and an axially aligned anchor portion, the anchor portion being outwardly biased relative to the longitudinal axis, and a plug body disposed around the central portion, wherein the anchor portion is configured to exert an axial force upon the plug body when inserted within an opening.

17 Claims, 8 Drawing Sheets

MASKING PLUG

FIELD

The present disclosure is generally related to plugs and, more particularly, to a plug for masking an opening.

BACKGROUND

Many types of manufactured parts, such as parts used in the manufacture of aircrafts, automobiles and machinery, may be coated with various materials and substances (e.g., paint) to adapt the part for its intended purpose. In many of these coating operations, the surface of the part may be completely exposed to the coating substance. Many types of parts may include features that must not be coated. The part may include inner surfaces through which coating substances could enter the part and undesirably come into contact with the internal surfaces of the part. For example, the part may include fastening openings (e.g., countersunk holes) that must remain free from the coating substance and other debris.

It may be undesirable to apply a coating substance to the internal surfaces of these types of parts for many reasons. For example, it may be undesirable to apply paint to the internal surfaces of a fastening opening because the paint may interfere with an installed fastener. It may also be undesirable for the coating substance to come into contact with the internal surfaces of the opening because the coating substance may damage the internal surface of the part.

Various approaches have been used to mask, or temporarily close, the openings in the parts, thereby preventing the coating substance from coming into contact with the internal surfaces of the opening, including masking tape dots or flexible plugs. These approaches may be less than adequate in completely sealing off a coating from the interior of a part. There may also be issues with the introduction of foreign object debris or with material compatibility.

Accordingly, those skilled in the art continue with research and development efforts in the field of masking openings in parts during a coating operation.

SUMMARY

In one embodiment, the disclosed masking plug may include a retainer having a longitudinal axis, the retainer including a central portion and an axially aligned anchor portion, the anchor portion being outwardly biased relative to the longitudinal axis, and a plug body disposed around the central portion, wherein the anchor portion is configured to exert an axial force upon the plug body when inserted within an opening.

In another embodiment, the disclosed masking plug may include a retainer having a longitudinal axis and including a base and aligned tail extending from the base, the tail including a plurality of legs, each leg of the plurality of legs being disposed at a first non-zero angle relative to the longitudinal axis, and a plug body extending circumferentially about the base, the plug body including a radial sidewall, the radial sidewall being disposed at a second non-zero angle relative to the longitudinal axis. Wherein the tail is configured to fit within a cylindrical opening when the legs are deflected inwardly, the plug body is configured to form an interference fit within a countersink axially aligned with the cylindrical opening, and the tail exerts an axial force upon the plug body when the legs return to a biased position relative to the longitudinal axis of the retainer.

In yet another embodiment, disclosed is a method for masking an opening, the method may include the steps of: (1) coupling a masking plug into an opening in a part, (2) inserting a retainer of the masking plug into a cylindrical hole of the opening, (3) inserting a plug body of the masking plug into a countersink of the opening, and (4) drawing the plug body into the countersink in response to an axial force applied to the plug body by expansion of an anchor portion of the retainer.

Other embodiments of the disclosed masking plug will become apparent from the following detailed description, the accompanying drawings and the appended claims.

DETAILED DESCRIPTION

Figure 1:
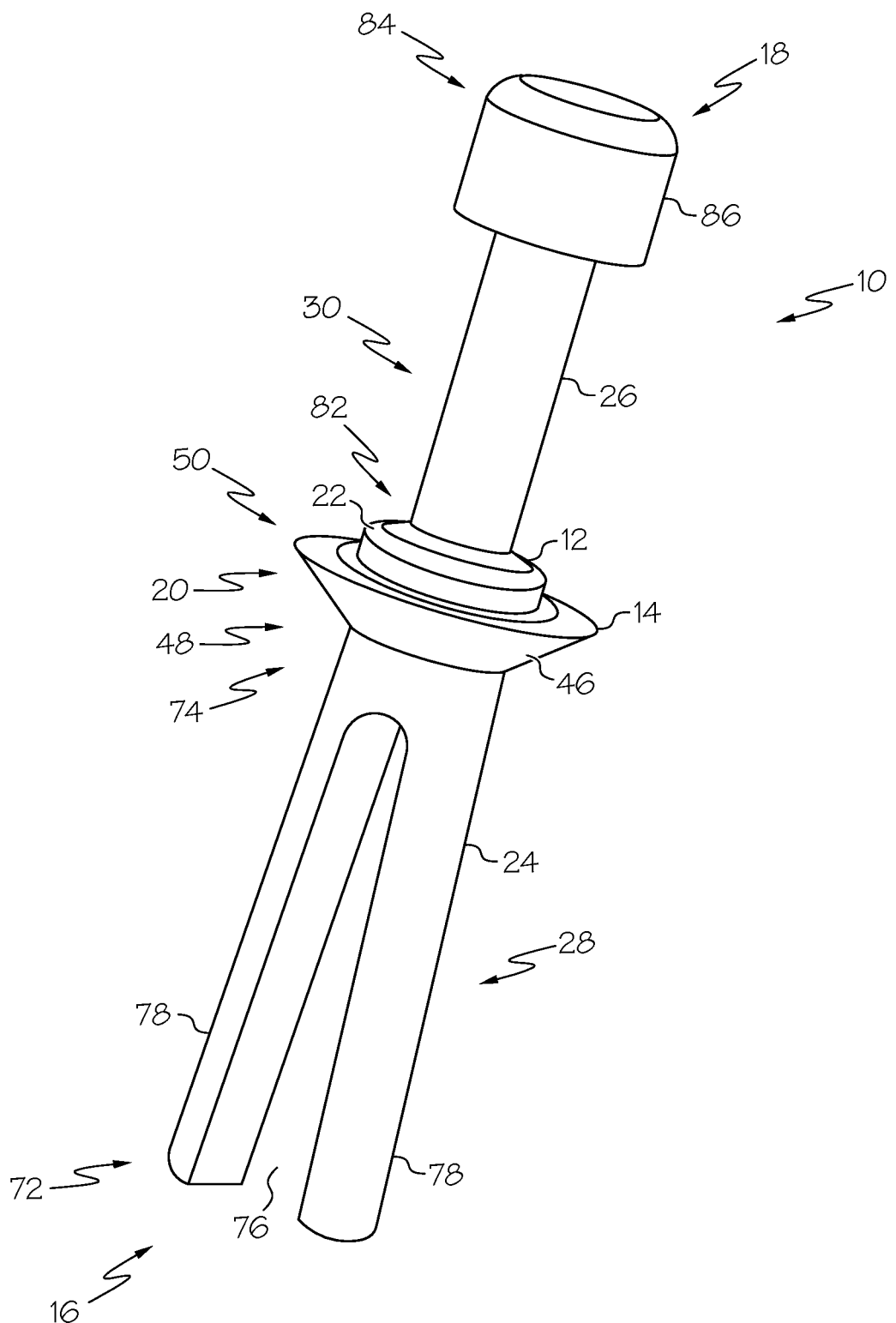
FIG. 1 is a front and side perspective view of one embodiment of the disclosed masking plug.
Figure 2:
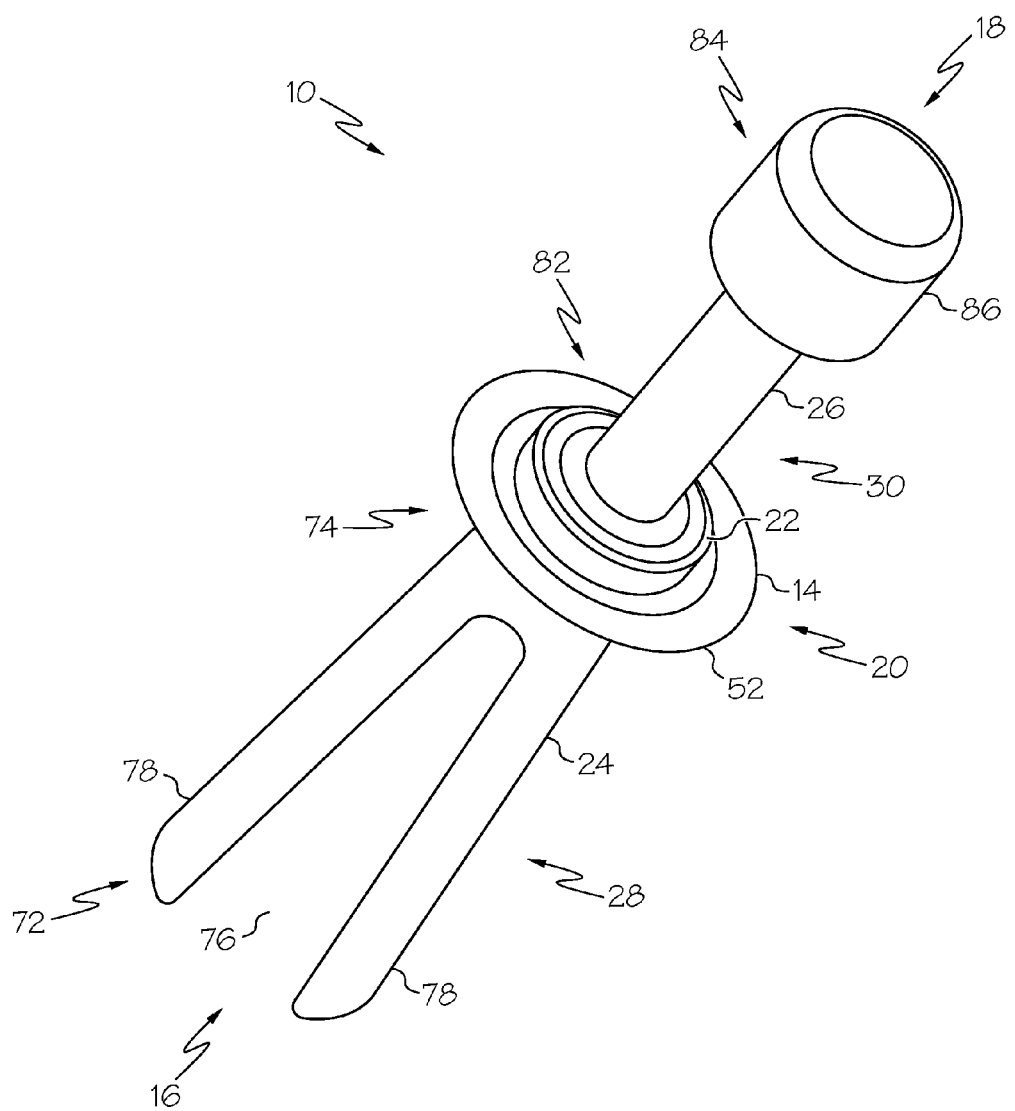
FIG. 2 is a top and front perspective view of the disclosed masking plug.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Referring to FIGS. 1-4, one embodiment of the disclosed masking plug, generally designated 10, may include a retainer 12 and a plug body 14. The retainer 12 may include a longitudinal axis A (FIG. 3), a first end 16 and a longitudinally opposed second end 18. The retainer 12 may include a base 22, a tail 24 and a stem 26, each being axially aligned along the longitudinal axis A.

The base 22 may define a central portion 20 of the retainer 12. The plug body 14 may be disposed around the central portion 20 of the retainer 12 between the first end 16 and the second end 18. For example, the plug body 14 may be disposed circumferentially around at least a portion of the base 22.

The tail 24 may extend longitudinally from the base 22 to the first end 16 of the retainer 12. Thus, the tail 24 may define an anchor portion 28 of the retainer 12. The stem 26 may extend longitudinally from the base 22 to the second end 18 of the retainer 12. Thus, the stem 26 may define a grip portion 30 of the retainer 12.

Figure 5:
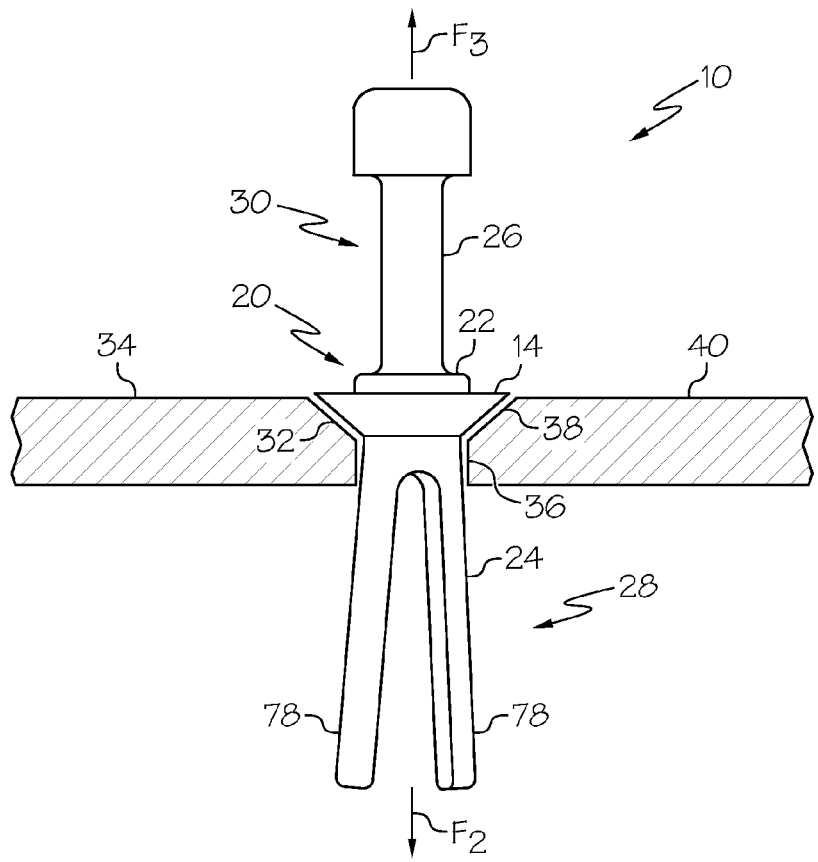
FIG. 5 is a side elevational view of the disclosed masking plug shown installed within an opening in a part.

Referring to FIG. 5, the disclosed masking plug 10 may have a particular utility for masking an opening 32 in a part 34 during a material coating operation. For example, the masking plug 10 may be inserted into the opening 32 in the part 34 in order to prevent coating materials (e.g., paint) and other substances from entering the opening 32 and coming into contact with an inner surface of the opening 32 and/or the part 34.

Figure 6:
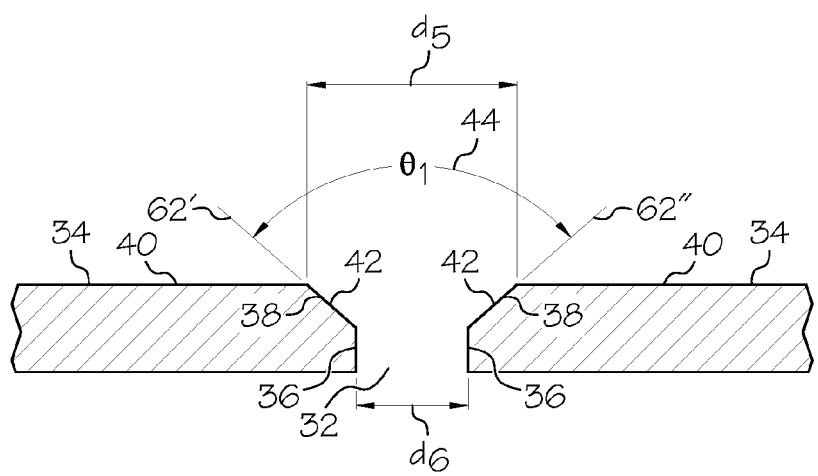
FIG. 6 is a side elevational view of the opening in the part of FIG. 5.

Referring to FIG. 6, the opening 32 may be any hole cut (e.g., drilled) into the part 34 (e.g., a manufactured object). For example, the opening 32 may include a cylindrical hole 36 extending through the part 34 and a countersink 38 (e.g., a conical hole) cut (e.g., milled) into a surface 40 of the part 34 and axially aligned with the cylindrical hole 36. The diameter of the countersink 38 at the surface 40 of the part 34 may be larger than the diameter of the cylindrical hole 36 to allow a head of a countersunk fastener (e.g., a bolt or a screw) (not shown), when placed in the cylindrical hole 36, to sit flush with or below the surface 40 of the surrounding material of the part 34.

The countersink 38 may include various chamfer angles $\Theta_1$ 44 (e.g., the angle defined between planes 62', 62" extending from opposing side wall surfaces 42 of the countersink 38). For example, the chamfer angle $\Theta_1$ 44 may be between approximately 60 degrees and 120 degrees. In a specific, non-limiting example, the chamfer angle $\Theta_1$ 44 may be 100 degrees, such as for use with aviation fasteners.

As another example, the opening 32 may include a cylindrical hole 36 extending through the part 34 and a counterbore (e.g., a cylindrical hole having a diameter larger than the diameter of the cylindrical hole 36) (not shown) cut into a surface 40 of the part 34 and axially aligned with the cylindrical hole 36.

As best illustrated in FIG. 5, the plug body 14 may include any size and shape suitable to be at least partially inserted into the opening 32. For example, the plug body 14 may include a generally frustoconical shape (e.g., having the shape of a cone with the narrow end removed) suitable to be at least partially inserted into the countersink 38 when the tail 24 of the retainer 12 is inserted through the cylindrical hole 36. For example, a narrower end may include a diameter that substantially corresponds to an outer diameter $d_6$ of the cylindrical hole 36 and a thicker end may include an outer diameter that substantially corresponds to an outer diameter $d_5$ of the countersink 38 (FIG. 6). For example, the plug body 14 may be suitably sized to slip fit within the countersink 38.

As a general, non-limiting example, the outer diameter $d_6$ of the cylindrical hole 36 may range from about 0.098 inches to about 1 inch, and the outer diameter $d_5$ of the countersink 38 may range from about 105 percent to about 200 percent of the outer diameter $d_6$ of the cylindrical hole 36.

In one variation, the plug body 14 may include a generally cylindrical shape suitable to be at least partially inserted into the counterbore (not shown) when the tail 24 of the retainer 12 is inserted through the cylindrical hole 36.

The plug body 14 may be made of a pliable material suitable to adapt to the size and shape of the countersink 38 upon insertion of the disclosed masking plug 10 into the opening 32. For example, the plug body 14 may be made of an elastomeric material. As a general, non-limiting example, the plug body 14 may be soft urethane, such as urethane having a Shore (durometer) hardness of at most about 60 using the A scale. As a specific, non-limiting example, the plug body 14 may be made of F-60 polyurethane.

Figure 7:
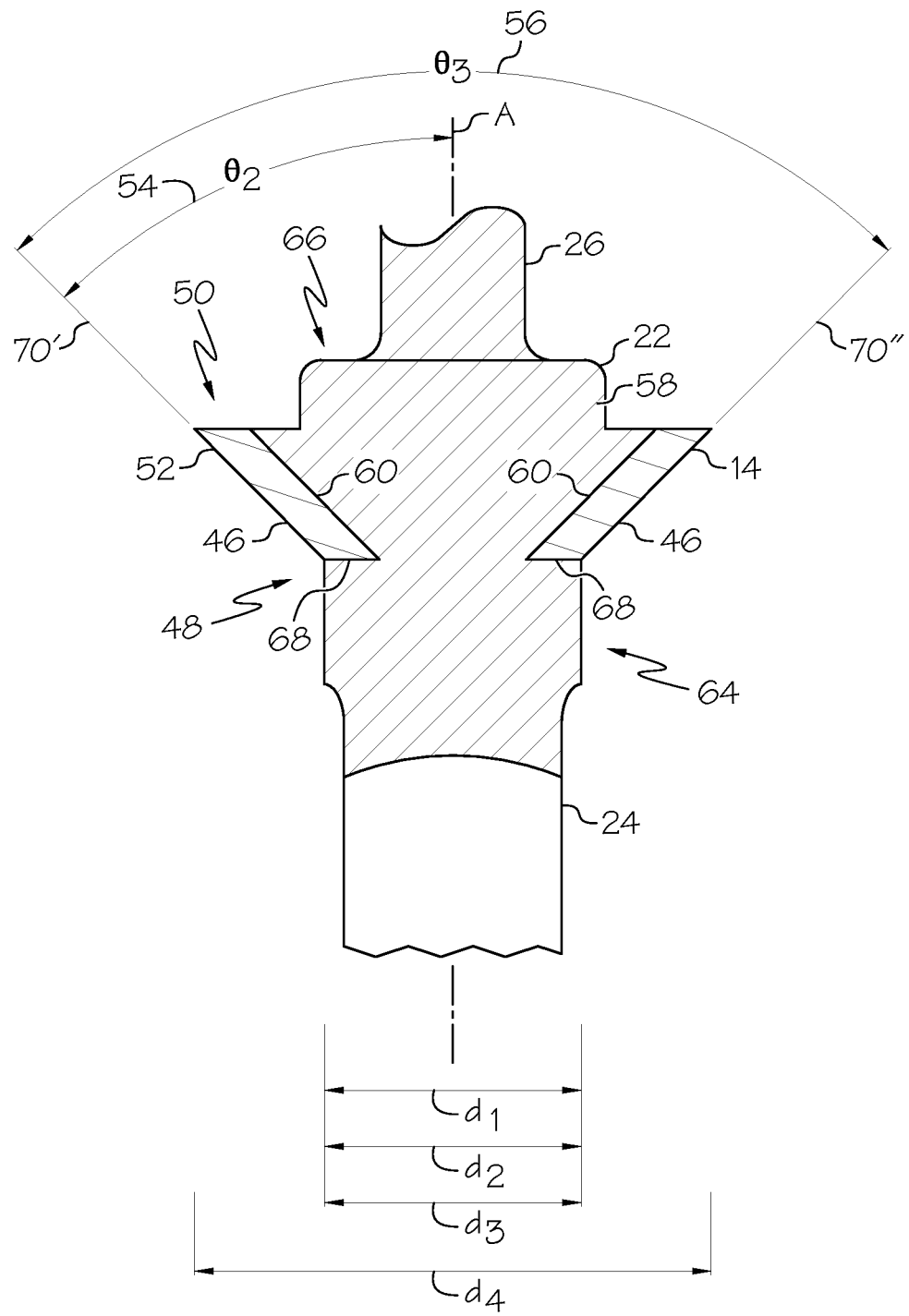
FIG. 7 is a side elevational view, in section, of the disclosed masking plug.

Referring to FIG. 7, the plug body 14 may include an annular portion 52 having a radial side wall 46 extending continuously about the longitudinal axis A of the retainer 12. The plug body 14 may include a first end 48 and an opposed second end 50. The base 22 may include first end 64 and a longitudinally opposed second end 66. A portion of the base 22 (e.g., between the first end 64 and the second end 66) may define a core 58 of the plug body 14. The annular portion 52 of the plug body 14 may include an axial opening 60 extending from the first end 48 to the second end 50. The opening 60 may include a suitable size and shape to receive the core 58.

The base 22 may be configured to retain the plug body 14 on the retainer 12 and prevent the plug body 14 from sliding off the retainer 12 (e.g., moving longitudinally toward the second end 18 of the retainer 12) when the disclosed masking plug 10 is inserted into the opening 32 (FIG. 5). In an example construction, and as best illustrated in FIG. 7, the core 58 may include a generally frustoconical shape and the opening 60 may include a generally frustoconical shape dimensioned in close tolerance with the core 58. In another example construction, the core 58 may include a generally cylindrical shape having an outwardly projecting annular lip (not shown) proximate (e.g., at or near) the second end 66 and the opening 60 may include a generally cylindrical shape having an annular shoulder (not shown) proximate (e.g., at or near) the second end 50 of the plug body 14.

The base 22 may be configured to retain the plug body 14 on the retainer 12 and prevent the plug body 14 from sliding off the retainer 12 (e.g., moving longitudinally toward the first end 16 of the retainer 12) when the disclosed masking plug 10 is removed from the opening 32 (FIG. 5). For example, the base 22 may define an annular shoulder 68 proximate the first end 64 of the base 22. The annular shoulder 68 may be suitable to support the first end 48 of the plug body 14.

Optionally, the plug body 14 may be affixed to the base 22 of the retainer 12 (e.g., around the core 58), such as with an adhesive or the like.

The first end 48 of the plug body 14 may include an outer diameter $d_1$ approximately equal to the outer diameter $d_2$ of the base 22. For example, the outer diameter $d_1$ of the first end 48 of the plug body 14 may be substantially equal to the outer diameter $d_3$ of the annular shoulder 68. The second end 50 of the plug body 14 may include an outer diameter $d_4$ greater than the outer diameter $d_2$ of the base 22. For example, the outer diameter $d_4$ of the second end 50 of the plug body 14 may be substantially greater than the outer diameter $d_2$ of the base 22 (e.g., at the second end 66).

For any given masking operation, the size (e.g., the length and/or diameter) of the plug body 14 (e.g., the annular portion 52) may be configured to substantially match the size (e.g., the depth and/or the diameter) of the countersink 38. For example, the outer diameter $d_4$ of the second end 50 of the plug body 14 may be approximately equal to or slightly larger than the outer diameter $d_5$ of the countersink 38 (FIG. 6) such that the plug body 14 covers the entire opening 32.

The radial sidewall 46 may extend between the first end 48 and the second end 50. The radial sidewall 46 may taper inwardly from the second end 50 to the first end 48 (e.g., forming the frustoconical shape of the plug body 14). For example, a plane 70' extending from the radial sidewall 46 at the second end of the plug body 14 may be disposed at a second non-zero angle $\Theta_2$ 54 relative to the longitudinal axis A of the retainer 12 (e.g., sidewall-to-axis angle) such that planes 70', 70" extending from opposite locations of the radial side wall 46 may be disposed at a non-zero angle $\Theta_3$ 56 relative to each other (e.g., sidewall-to-sidewall angle). For example, the sidewall-to-axis angle $\Theta_2$ 54 may be between approximately 32.5 degrees and 65 degrees such that sidewall-to-sidewall angle $\Theta_3$ 56 may be between approximately 65 degrees and 130 degrees.

In an example embodiment, the sidewall-to-sidewall angle $\Theta_3$ 56 may be slightly larger than the chamfer angle $\Theta_1$ 44 (FIG. 6). For example, for use in masking an opening 32 including a countersink 38 having a chamfer angle $\Theta_1$ 44 of 100 degrees (e.g., such as is aviation applications), the sidewall-to-sidewall angle $\Theta_3$ 56 may be approximately 105 degrees (e.g., sidewall-to-axis angle $\Theta_2$ 54 may be approximately 52.5 degrees). Thus, when the disclosed masking plug 10 is installed (e.g., inserted) into the opening 32, the slightly larger sidewall-to-sidewall angle $\Theta_3$ 56 compared to the chamfer angle $\Theta_1$ 44 and the pliability of the annular portion 52 may allow the plug body 14 to flex and create a complete seal around the perimeter of the countersink 38, as best illustrated in FIG. 5.

Referring again to FIGS. 1-4, the retainer 12, including the base 22, the tail 24 and the stem 26, may be made of a substantially rigid and durable material. For example, the retainer 12 may be made from a hard plastic material, such as a plastic material having a Shore (durometer) hardness of at least about 80 using the D scale. As a general, non-limiting example, the retainer 12 may be made of a hard urethane, such as a urethane having a Shore (durometer) hardness of at least about 80 using the D scale. As a specific, non-limiting example, the retainer 12 may be made of TC-852 polyurethane.

The base 22 may include a generally cylindrical shape having an outer diameter $d_2$ substantially equal to the outer diameter $d_6$ of the cylindrical hole 36 of the opening 32 (FIG. 6). The tail 24 may extend from the first end 64 of the base 22. The tail 24 may include a first end 72 (e.g., the terminal end) and a longitudinally opposed second end 74 (e.g., at the first end 64 of the base 22).

Figure 3:
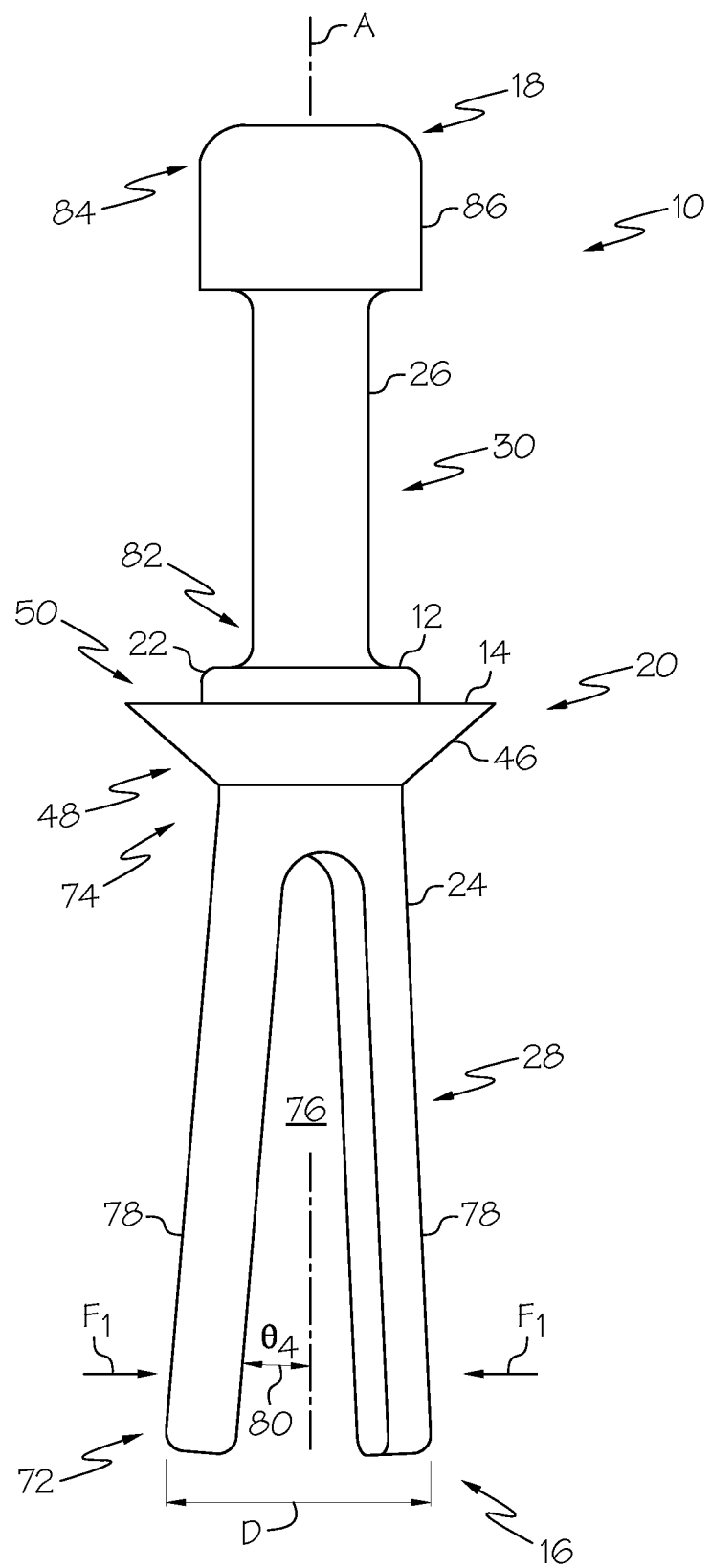
FIG. 3 is a front elevational view of the disclosed masking plug.
Figure 4:
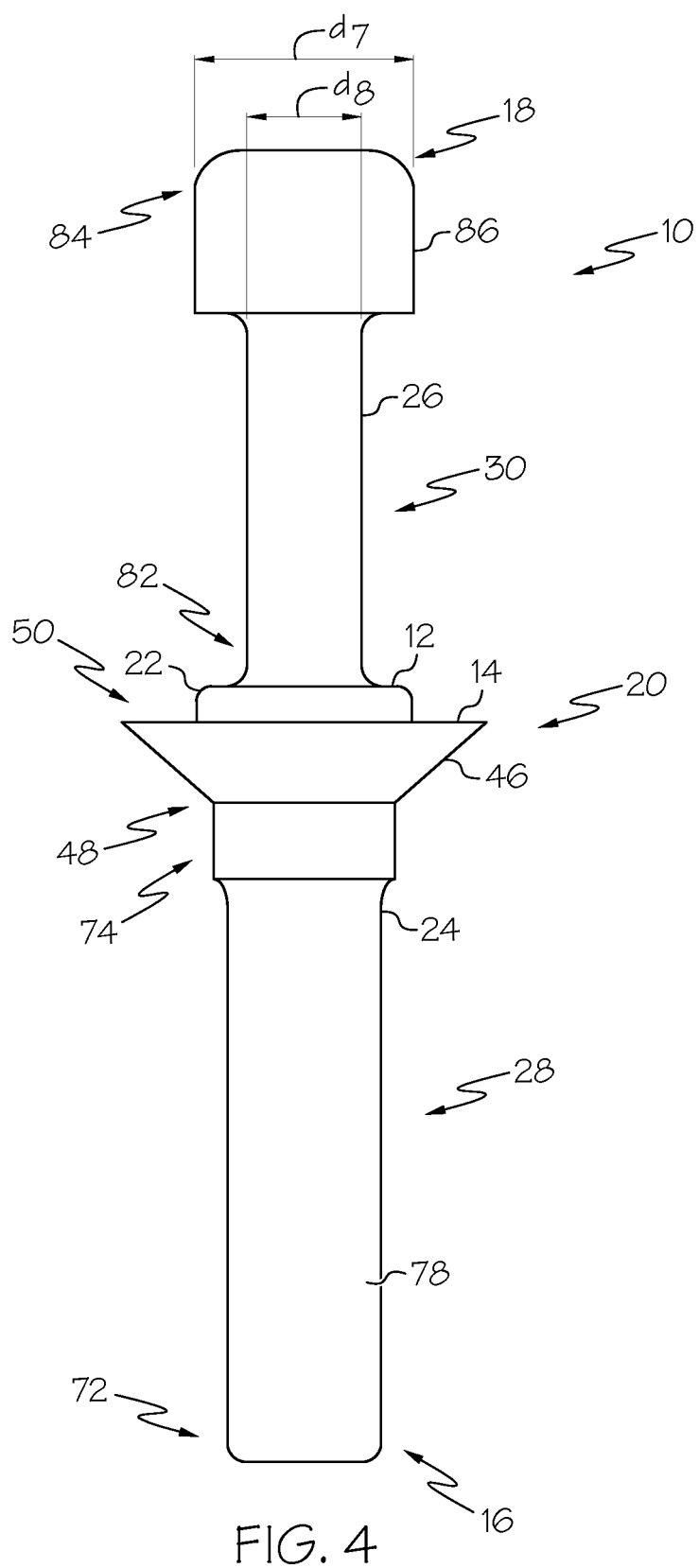
FIG. 4 is a side elevational view of the disclosed masking plug.

Referring to FIG. 3, the tail 24 may include at least one split 76 extending from the first end 72 toward the second end 74. The split 76 may define at least two legs 78. Each leg 78 may be biased at an outward angle from the second end 74 to the first end 72 of the tail 24 such that the outer distance D between the legs 78 is slightly larger than the diameter $d_2$ of the base 22 (FIG. 7). Thus, the outer distance D between the legs 78 may be slightly larger than the diameter $d_6$ of the cylindrical hole 36 of the opening 32 (FIG. 6).

For example, each leg 78 may be disposed at a first non-zero angle $\Theta_4$ 80 relative to the longitudinal axis A of the retainer 12 (e.g., leg-to-axis angle). For example, the leg-to-axis angle $\Theta_4$ 80 may be between approximately 5 degrees and 15 degrees. The legs 78 may deflect inwardly (e.g., to an unbiased position toward the longitudinal axis A of the retainer 12) in response to a compression force $F_1$ (e.g., in response to being squeezed together).

As best illustrated in FIG. 5, during installation of the disclosed masking plug 10, the legs 78 may be deflected inwardly to the unbiased position (e.g., by exerting an inwardly directed force $F_1$) in order to sufficiently reduce the outer distance D (FIG. 3) between the legs 78 to be smaller than the outer diameter $d_6$ (FIG. 6) of the cylindrical hole 36 of the opening 32, such that at least a portion of the anchor portion 28 (e.g., the tail 24) may be inserted into and through the cylindrical hole 36. Upon insertion of the tail 24 through the cylindrical hole 36, the legs 78 may at least partially return to an outwardly biased position to secure the retainer 12 within the opening 32 by an interference fit. As the legs 78 spread apart toward the outwardly biased position, the tail 24 may exert and/or maintain an axial force $F_2$ upon the plug body 14 tending to draw and/or hold the plug body 14 (and the retainer 12) within the opening 32 thus, further creating a complete seal between the plug body 14 (e.g., a perimeter of the second end 50 of the plug body 14) and the side wall surface 42 of the countersink 38 (e.g., at the perimeter of the opening 32).

Referring again to FIGS. 1-4, the stem 26 may extend from the second end 66 of the base 22. The stem 26 may include a first end 82 (e.g., at the second end 66 of the base 22) and a longitudinally opposed second end 84 (e.g., the terminal end). The stem 26 may include a head 86 disposed at the second end 84. The head 86 may protrude radially outward from the main portion of the stem 26 to provide a graspable location proximate the second end 84. For example, the head 86 may include an outer diameter $d_7$ larger than the outer diameter $d_8$ (FIG. 4) of the stem 26.

Following completion of a masking operation, the disclosed masking plug 10 may be easily removed from the opening 32 in response to an axial force $F_3$ (FIG. 5) (e.g., by pulling the retainer 12 out from the opening 32). Therefore, the disclosed masking plug 10 may be reused numerous times.

Thus, providing the disclosed masking plug 10 with a retainer 12 that includes a stem 26 and legs 78 formed from a rigid material and a plug body 14 formed from a pliable material may facilitate insertion of the masking plug 10 into an opening 32, while ensuring that the masking plug 10 is retained within the opening 32, but may also facilitate easy removal of the masking plug 10 from the opening 32 and subsequent reuse of the masking plug 10 in another opening 32.

Figure 8:
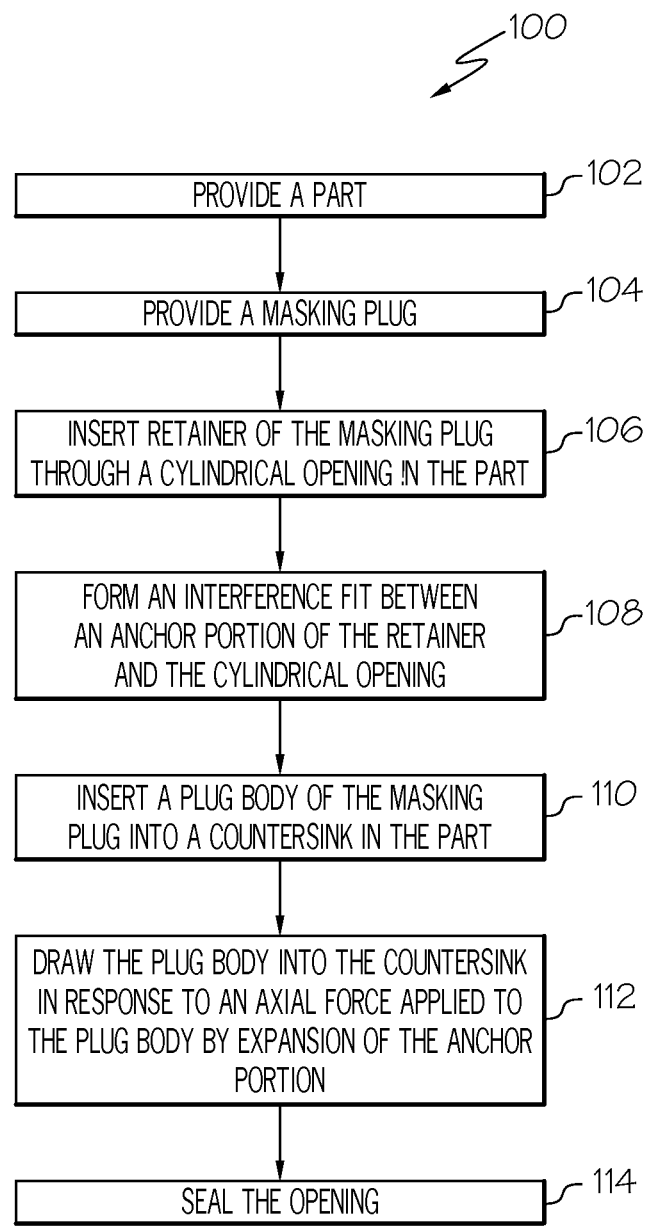
FIG. 8 is a flow diagram of one embodiment of the disclosed method for masking an opening.

Referring to FIG. 8 and in reference to FIGS. 1 and 5, also disclosed is one embodiment of the disclosed method, generally designated 100, for masking an opening. As shown at block 102, a part 34 may be provided. The part 34 may include at least one opening 32. The opening 32 may include a cylindrical hole 36 extending through the part 34 and a countersink 38 axially aligned with the cylindrical hole 36 at the surface 40 of the part 34.

As shown at block 104, a masking plug 10 may be provided. The masking plug 10 may include a retainer 12 and a plug body 14 received over the retainer 12. The retainer 12 may include a base 22 defining a central portion 20, a tail 24 defining an anchor portion 28 and a stem 26 defining a grip portion 30. The plug body 14 may be disposed circumferentially around at least a portion of the base 22 defining a rigid core 58 of the plug body 14. The plug body 14 may protrude radially outward from the base 22. The tail 24 may include at least one split 76 defined in the anchor portion 28 and forming at least two outwardly biased legs 78.

As shown at block 106, the retainer 12 may be at least partially inserted through the cylindrical opening 36. For example, the anchor portion 28 may be inserted into the cylindrical opening 36 such that the legs 78 of the tail 24 extend through the cylindrical opening 36, as best illustrated in FIG. 5.

As shown at block 108, an interference fit may be formed between the anchor portion 28 and the cylindrical opening 36. For example, as the anchor portion 28 at least partially returns to an outwardly biased position, the legs 78 may exert a force upon the sidewall of the cylindrical opening 36 (e.g., proximate the perimeter of the cylindrical opening 36 opposite the countersink 38) to secure the masking plug 10 within the opening 32.

As shown at block 110, the plug body 14 may be at least partially inserted into the countersink 38. For example, the plug body 14 may be compressed within the countersink 38 during insertion of the anchor portion 28 of the retainer 12 through the cylindrical opening 38, as best illustrated in FIG. 5.

As shown at block 112, the plug body 14 may be drawn further into (or held within) the countersink 38 in response to an axial force F2 of sufficient magnitude applied to the plug body 14 by expansion of the outwardly biased legs 78 of the anchor portion 28. For example, the axial force F2 may maintain the compressed position of the plug body 14 within the countersink 38.

As shown at block 114, the axial force F2 may create and/or maintain a complete seal between the plug body 14 (e.g., a perimeter of a second end 50 of the plug body 14) and a perimeter of the countersink 38.

Figure 9:
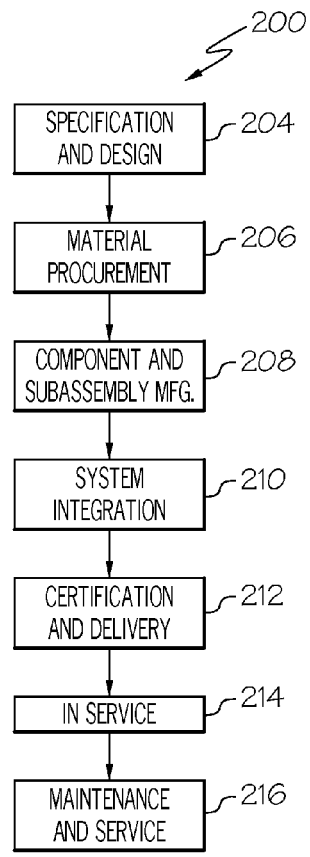
FIG. 9 is flow diagram of an aircraft production and service methodology.
Figure 10:
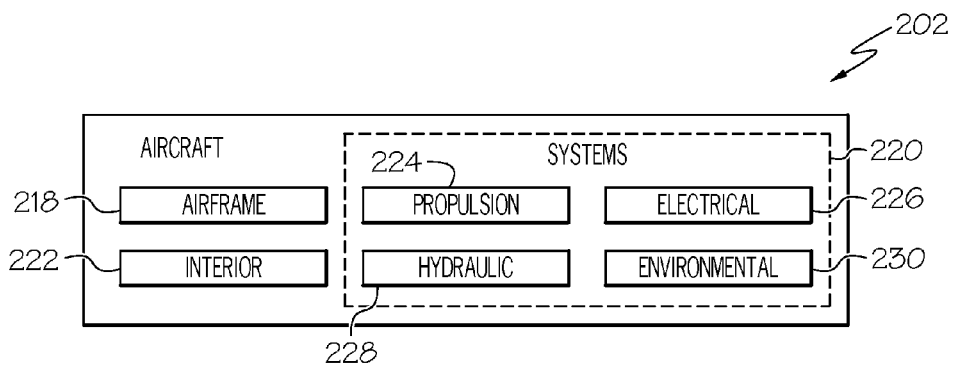
FIG. 10 is a block diagram of an aircraft.

Examples of the disclosure may be described in the context of an aircraft manufacturing and service method 200, as shown in FIG. 9, and an aircraft 202, as shown in FIG. 10. During pre-production, the aircraft manufacturing and service method 200 may include specification and design 204 of the aircraft 202 and material procurement 206. During production, component/subassembly manufacturing 208 and system integration 210 of the aircraft 202 takes place. Thereafter, the aircraft 202 may go through certification and delivery 212 in order to be placed in service 214. While in service by a customer, the aircraft 202 is scheduled for routine maintenance and service 216, which may also include modification, reconfiguration, refurbishment and the like.

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 10, the aircraft 202 produced by example method 200 may include an airframe 218 with a plurality of systems 220 and an interior 222. Examples of the plurality of systems 220 may include one or more of a propulsion system 224, an electrical system 226, a hydraulic system 228, and an environmental system 230. Any number of other systems may be included. Although an aerospace example is shown, the principles of the disclosed masking plug 10 and method 100 may be applied to other industries, such as the automotive industry.

Apparatus and methods embodied herein may be employed during any one or more of the stages of the production and service method 200. For example, components or subassemblies corresponding to component/subassembly manufacturing 208, system integration 210, and/or maintenance and service 216 may utilize the disclosed masking plug 10 and method 100. Also, one or more apparatus examples, method examples, or a combination thereof may be utilized during component/subassembly manufacturing 208 and/or system integration 210, for example, by substantially expediting assembly of or reducing the cost of an aircraft 202, such as the airframe 218 and/or the interior 222. Similarly, one or more of apparatus examples, method examples, or a combination thereof may be utilized while the aircraft 202 is in service, for example and without limitation, to maintenance and service 216.

Although various embodiments of the disclosed masking plug have been shown and described, modifications may occur to those skilled in the art upon reading the specification. The present application includes such modifications and is limited only by the scope of the claims.

What is claimed is:

1. A masking plug for preventing a coating material from entering an opening formed through a part, said masking plug comprising:
a retainer having a longitudinal axis, a first end, a longitudinally opposed second end, and a central portion disposed between said first end and said second end, said retainer comprising:
an axially aligned anchor portion extending from said central portion to said first end, said anchor portion comprising at least two legs being outwardly biased relative to said longitudinal axis; and
an axially aligned grip portion extending from said central portion to said second end; and
a plug body extending circumferentially about said central portion, said plug body comprising a radial sidewall disposed at a first non-zero angle relative to said longitudinal axis and having a minimum diameter approximately equal to a diameter of said opening and a maximum diameter greater than said diameter of said opening, and
wherein said anchor portion exerts an axial force upon said plug body when inserted through said opening.

2. The masking plug of claim 1 wherein said grip portion of said retainer further comprises a stem.

3. The masking plug of claim 2 wherein said stem comprises a head at said second end of said retainer.

4. The masking plug of claim 1 wherein said opening is defined by a cylindrical portion and a countersink portion, and wherein said maximum diameter of said plug body is greater than a cylindrical portion-diameter of said cylindrical portion of said opening and one of equal to or greater than a countersink portion-diameter of said countersink portion of said opening.

5. The masking plug of claim 1 wherein said retainer is formed from a rigid material.

6. The masking plug of claim 1 wherein said legs are outwardly biased at a second non-zero angle relative to said longitudinal axis, wherein a distance between said legs in a biased position is greater than said diameter of said opening, and wherein said legs deflect inwardly, to an unbiased position in which said distance between said legs is less than said diameter of said opening, in response to a compression force.

7. The masking plug of claim 6 wherein said axial force is created by said legs expanding from said unbiased position to said biased position and has a magnitude sufficient to maintain a sealing engagement between said plug body and a perimeter of said opening, when said plug body is inserted into said opening.

8. The masking plug of claim 1 wherein said plug body is formed from a pliable material capable of flexing in response to said axial force to create a seal around a perimeter of said opening.

9. The masking plug of claim 1 wherein said plug body comprises a frustoconical shape.

10. A masking plug for preventing a coating material from entering an opening formed through a part, said masking plug comprising:
a retainer having a longitudinal axis, a first end, and a second end longitudinally opposed to said first end, said retainer comprising:
a base disposed approximately between said first end and said second end;
an axially aligned tail extending from said base to said first end of said retainer, said tail comprising a plurality of legs, each leg of said plurality of legs being outwardly biased at a first non-zero angle relative to said longitudinal axis such that a distance between said legs in a biased position is greater than a cylindrical portion diameter of said opening, and said legs deflect inwardly, to an unbiased position in which said distance between said legs is less than said cylindrical portion diameter, in response to a compression force; and an axially aligned stem extending from said base to said second end of said retainer;

a plug body extending circumferentially about said base, said plug body comprising a radial sidewall, said radial sidewall being disposed at a second non-zero angle relative to said longitudinal axis and having a minimum diameter approximately equal to said cylindrical portion diameter of said opening and a maximum diameter greater than a countersink portion diameter of said opening, wherein said tail exerts an axial force upon said plug body when inserted through said opening, said axial force being created by said legs expanding from said unbiased position to said biased position.

11. The masking plug of claim 10 wherein said second non-zero angle is between about 32 degrees and about 65 degrees.

12. The masking plug of claim 11 wherein said second non-zero angle is about 52 degrees.

13. The masking plug of claim 11 wherein said plug body is formed from a pliable material capable of flexing in response to said axial force to create a seal around a perimeter of said opening.

14. The masking plug of claim 10 wherein said first non-zero angle is between about 5 degrees and about 15 degrees.

15. The masking plug of claim 10 wherein said plug body comprises a frustoconical shape.

16. The masking plug of claim 10 wherein said tail is configured to fit within and extend through a cylindrical portion of said opening when said legs are deflected inwardly in response to said compression force, wherein said plug body is configured to form an interference fit within a countersink portion of said opening axially aligned with said cylindrical portion of said opening, and wherein said tail exerts said axial force upon said plug body when said legs at least partially return to said biased position relative to said longitudinal axis of said retainer.

17. The masking plug of claim 10 wherein said base comprises:

a core having a frustoconical shape to constrain said plug body from linear motion along said longitudinal axis toward said second end of said retainer; and an annular shoulder in contact with said plug body to constrain said plug body from linear motion along said longitudinal axis toward said first end of said retainer.

* * * * *